(12) United States Patent
Chen

(10) Patent No.: US 9,088,224 B2
(45) Date of Patent: Jul. 21, 2015

(54) VARIABLE VOLTAGE CONVERTER WITH STABILIZED OUTPUT VOLTAGE

(76) Inventor: Lihua Chen, Northville, MI (US)

(*) Notice: Subject to any disclaimer, the term of this patent is extended or adjusted under 35 U.S.C. 154(b) by 394 days.

(21) Appl. No.: 12/841,062

(22) Filed: Jul. 21, 2010

(65) Prior Publication Data

US 2012/0019231 A1    Jan. 26, 2012

(51) Int. Cl.
H02M 7/5387     (2007.01)
H02M 7/48       (2007.01)
H02M 3/155      (2006.01)
B60L 15/00      (2006.01)
H02M 1/00       (2007.01)

(52) U.S. Cl.
CPC ............... *H02M 7/48* (2013.01); *B60L 15/007* (2013.01); *H02M 3/155* (2013.01); *B60L 2220/14* (2013.01); *H02M 2001/007* (2013.01)

(58) Field of Classification Search
CPC ....... H02M 3/24; H02M 3/335; H02M 3/158; H02M 7/48; H02M 3/155; H02M 2001/007; G05F 3/02; B60L 15/007; B60L 2220/14
USPC ................. 363/56.04, 56.05, 75, 96, 97, 131; 323/312
See application file for complete search history.

(56) References Cited

U.S. PATENT DOCUMENTS

| | | | | |
|---|---|---|---|---|
| 5,057,990 A * | 10/1991 | Gulczynski | .................... | 363/131 |
| 5,532,919 A * | 7/1996 | Gegner | .......................... | 363/124 |
| 5,998,976 A * | 12/1999 | Steffan | ............................. | 322/10 |
| 6,370,050 B1 | 4/2002 | Peng et al. | | |
| 6,420,793 B1 * | 7/2002 | Gale et al. | ........................ | 290/34 |
| 6,583,999 B1 * | 6/2003 | Spindler et al. | .................. | 363/98 |
| 6,953,100 B2 | 10/2005 | Aberle et al. | | |
| 7,439,631 B2 | 10/2008 | Endou | | |
| 2004/0036458 A1 * | 2/2004 | Johnson et al. | ............... | 323/282 |
| 2004/0178756 A1 | 9/2004 | Zhenxing | | |
| 2006/0262577 A1 * | 11/2006 | Schenk | ........................... | 363/50 |
| 2007/0230220 A1 * | 10/2007 | Chan et al. | ....................... | 363/16 |
| 2007/0236965 A1 * | 10/2007 | Chen et al. | ....................... | 363/17 |
| 2008/0246508 A1 * | 10/2008 | Wang et al. | .................... | 324/771 |
| 2008/0316779 A1 * | 12/2008 | Jayaraman et al. | ............. | 363/74 |
| 2009/0033302 A1 | 2/2009 | Hariu | | |
| 2009/0237019 A1 | 9/2009 | Yamakawa et al. | | |
| 2011/0273142 A1 * | 11/2011 | Jin | ................. | 320/137 |

FOREIGN PATENT DOCUMENTS

CN          1503441          6/2004

* cited by examiner

*Primary Examiner* — Jessica Han
*Assistant Examiner* — Gustavo Rosario Benitez
(74) *Attorney, Agent, or Firm* — Maristyn Law LLC; Lynda Kouroupis; David B. Kelley

(57) ABSTRACT

A power conversion circuit includes a variable voltage converter (VVC) with a stabilizing means for stabilizing its output voltage. The stabilizing means can be in the form of a diode that clamps the VVC output voltage to the VVC input voltage so that the output voltage does not drop below the input voltage when a load imposes a sudden power demand. The stabilizing means also enables a bypass mode in which transient power can be provided from a power source to an inverter without current flow through the VVC inductor or switches. When embodied as a diode, the stabilizing means can increase the maximum power that can be transferred by the power conversion circuit, improve the power response of the circuit, minimize control instability, and reduce power losses.

14 Claims, 3 Drawing Sheets

VARIABLE VOLTAGE CONVERTER WITH STABILIZED OUTPUT VOLTAGE

FIELD OF INVENTION

This invention relates generally to power conversion circuits, and more particularly to a power conversion circuit having a stabilized variable voltage converter.

BACKGROUND OF INVENTION

Electric and hybrid electric vehicles employ an electric motor drive system that has lower energy costs and emits fewer pollutants than a conventional internal combustion engine (ICE) drive system. Various configurations of hybrid electric vehicles have been developed. In a first configuration, an operator can choose between electric operation and ICE operation. In a series hybrid electric vehicle (SHEV) configuration, an engine is connected to an electric motor referred to as a generator. The generator provides electricity to a battery and another motor referred to as a traction motor. In the SHEV, the traction motor is the sole source of wheel torque. There is no mechanical connection between the engine and the drive wheels. In a further configuration, a parallel hybrid electric vehicle (PHEV), an engine and an electric motor cooperate to provide the wheel torque to drive the vehicle. In addition, in a PHEV configuration, the motor can be used as a generator to charge the battery from the power produced by the ICE. A further configuration, a parallel/series hybrid electric vehicle (PSHEV), has characteristics of both the SHEV and the PHEV.

Electric propulsion in an HEV can be performed by an electric drive system that can include a number of components, typically at least including a power conversion circuit and a motor. In this arrangement, the power conversion circuit can controllably transfer power from a power source to the motor to drive a load. A typical power conversion circuit can comprise a power source, such as a high voltage battery, and an inverter system controller (ISC) circuit, which can include a variable voltage converter (VVC) and an inverter circuit. In a typical configuration, a power source is located on what is referred to as an input side of the VVC and the inverter circuit is arranged on what is referred to as an output side of the VVC. A VVC can boost a direct current voltage provided by the battery to a higher voltage to drive the motor and improve vehicle performance. When used to boost a voltage from an input side to an output side, the converter is referred to as a boost converter.

A VVC can also be used to step down or lower a voltage from one side to another. For example, the higher voltage on a motor/generator side of a VVC can be stepped down to a lower voltage in order to charge a battery on an opposing side of the VVC. In the field of hybrid vehicles, it is common practice to charge a battery through regenerative braking, in which the mechanical energy of the wheels is converted to electrical energy by a generator, or by a motor operating as a generator, and provided to the battery via the VVC. When used to step down or reduce a voltage, the converter is referred to as a buck converter. A VVC can also operate in a pass-through mode in which transient current flows from the battery side to the inverter side, with no boost in voltage.

Generally it is preferable that the output voltage $V_O$ on the inverter or motor/generator side of the VVC should remain higher than the input voltage $V_I$ on the battery side of the VVC in a power conversion circuit for a hybrid vehicle. When the output voltage $V_O$ drops below $V_I$, control over the VVC can be lost, causing the system to become unstable. Such a voltage drop can occur in a hybrid electric vehicle when a motor makes a sudden power demand, or during active motor damping (AMD) braking operations. Prior art methods of answering the intrinsic instability problem of some VVC operations included methods that focused on avoiding the conditions that could trigger VVC instability. For example, some solutions required that circuits be designed with finely tuned control parameters. However, because there can be disparity in circuit component characteristics, for example, capacitances can vary by as much as 20%, the control parameters had to be customized for individual circuits. Circuit customization can be time-consuming and expensive, prohibitively so for systems manufactured at mass-production facilities.

At the power supply side of a VVC, is typically an inductor configured to store energy to be transferred across the VVC. In general, in prior art circuits current flows through the VVC inductor and the VVC switches regardless of whether the VVC is operating in a buck, boost or pass-through mode. This multiple-mode current flow requirement controlled the inductor specifications, the heat dissipation design, the rate at which energy could be transferred, the power losses of a VVC, and the maximum amount of power that could be delivered by a VVC. In addition, the power flow limitation often worsened as the voltage of the high voltage battery decreased.

SUMMARY OF THE INVENTION

An example system can include a power source, a variable voltage converter (VVC) and a stabilizing means directly coupled to said VVC and configured to stabilize said VVC output voltage to prevent said VVC output voltage from falling below said VVC input voltage. In an example embodiment, the VVC is configured to interface the power source with an inverter.

In a preferred embodiment, an example power conversion system can be implemented in an electric drive system for a hybrid electric vehicle to provide power to a machine, such as an electric motor. In an example system, the VVC stabilizing means is embodied as a clamping means configured to clamp the output voltage of the VVC, i.e. the voltage on an inverter side of the VVC, to the input voltage for the VVC, i.e. the voltage on the battery side of the VVC. In an example embodiment, the stabilizing means is embodied as a general diode. In addition to stabilizing the VVC output voltage, the stabilizing means also enables a VVC bypass mode for the power conversion system in which power can be transferred from the power source to an inverter without current flow through the VVC. Operating in a bypass mode conserves energy, reduces costs, and improves the power response of the power conversion circuit.

An example stabilized VVC is configured to interface a power source with an inverter, and includes an inductor, a circuit branch comprising a first switch connected in series to a second switch, the circuit branch connected to the inductor, and a stabilizing means connected to the circuit branch and configured to stabilize the VVC output voltage.

In an exemplary embodiment, the stabilizing means can be embodied as a diode that provides minimum voltage clamping of a VVC output voltage to a VVC input voltage so that the output voltage on an inverter side of the VCC does not fall below the input voltage on a battery side of the VVC. In an exemplary embodiment, the stabilizing means is configured to enable bypass operation wherein power is transferred to an inverter coupled to said VVC without current flow through the VVC inductor or circuit branch.

DETAILED DESCRIPTION OF EXEMPLARY EMBODIMENTS

Figure 1:
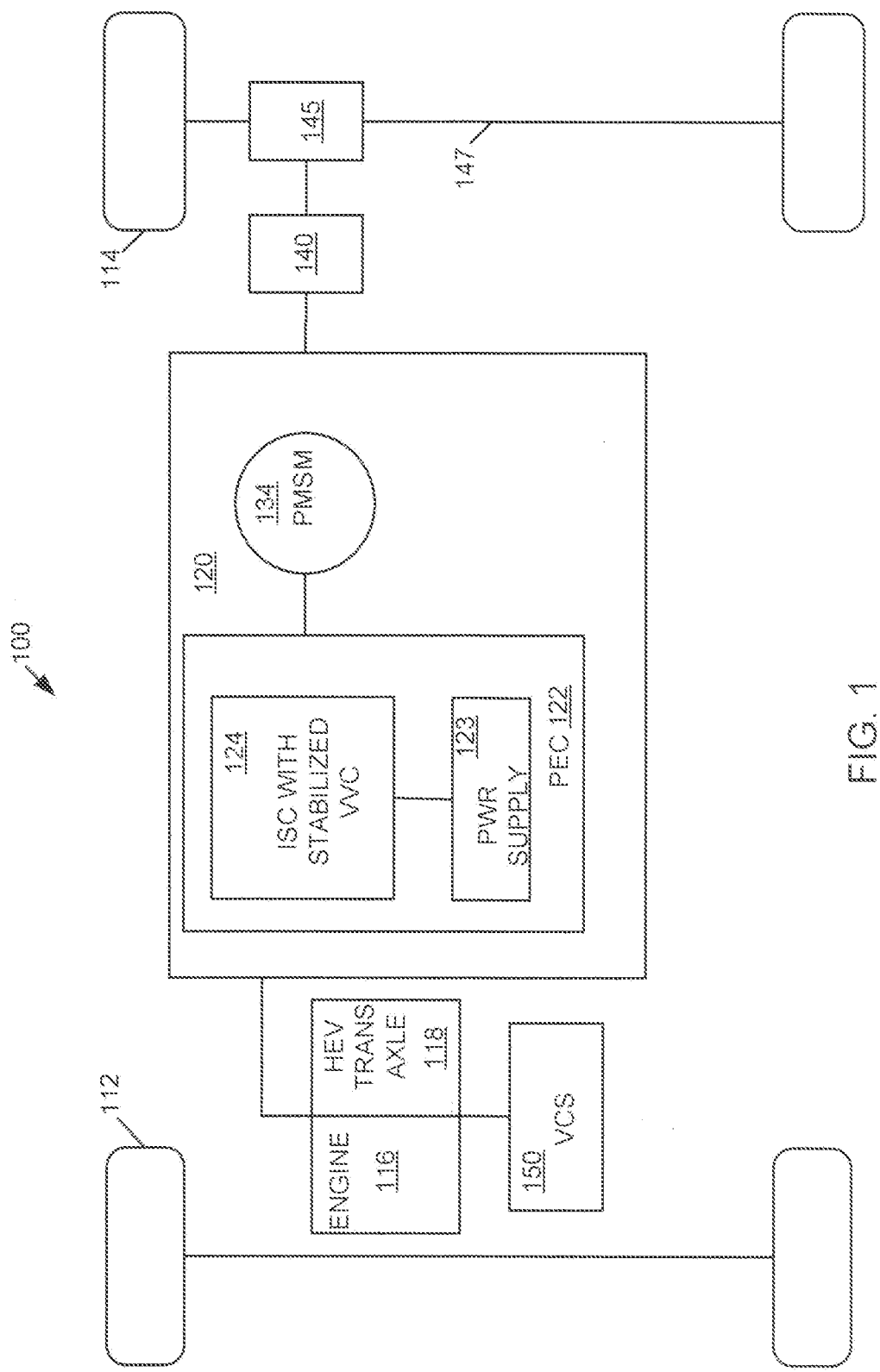
FIG. 1 shows an example electric drive system having a VVC stabilizer.

Example embodiments of the invention are presented herein; however, the invention may be embodied in a variety of alternative forms, as will be apparent to those skilled in the art. To facilitate understanding of the invention, and provide a basis for the claims, various figures are included in the specification. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. For example, control modules for various systems can be variously arranged and/or combined and may not be depicted in illustrations of example embodiments herein in order to better emphasize novel aspects of the invention.

In general, a variable voltage converter (VVC) circuit of a hybrid electric vehicle (HEV) is configured to interface a power source with an inverter, which in turn can provide current to a permanent magnet synchronous machine (PMSM) functioning as a motor. It can also be configured to provide energy from a generator on the inverter side of an ISC to the power source to recharge it. At times, a rapid transfer of energy may occur in either direction across the Power Electronics Controller (PEC), from power supply to motor, or from a generator to a battery. Under certain operating conditions, particularly those in which large amounts of energy are transferred back and forth, a VVC of a power conversion circuit can become unstable. Instability in a VVC can significantly affect vehicle performance, particularly during an electric drive mode in which an electric motor alone is powering a vehicle.

When operated in a boost mode, a VVC can be subject to an intrinsic Right-Half Plane Zero (RHPZ) effect in which the VVC transfer function includes a zero in the right half of the s-plane, which can lead to system instability under certain conditions, adversely affecting vehicle performance. As discussed above, in general, current passes through an inductor to enter a VVC from a battery side. Under such a configuration, the output current $I_{OUT}$ of a VVC to a load can be expressed as:

$$I_{OUT} = I_L * (1-D) \quad \text{(Eqn. 1)}$$

Where $I_L$ is the current through the inductor; and
D is the pulse width modulation (PWM) control duty cycle of a lower switch of a VVC The output power $P_{OUT}$ of a VVC can be expressed as:

$$P_{OUT} = V_{OUT} * I_{OUT} \quad \text{(Eqn. 2)}$$

Where $V_{OUT}$ is the output voltage of a VVC
Using the above equations, it follows that the output power can be expressed as:

$$P_{OUT} = V_{OUT} * I_L * (1-D) \quad \text{(Eqn. 3)}$$

From Eqn. 3 it follows that if the output voltage, $V_{OUT}$ is held constant, a change in output power $P_{OUT}$ should be associated with a similar change in output current $I_{OUT}$, namely the product $I_L*(1-D)$. For example, if $P_{OUT}$ increases, the product $I_L*(1-D)$ should increase, and if $P_{OUT}$ decreases, the product $I_L*(1-D)$ should decrease. However, when the duty cycle D increases and the inductor current $I_L$ increases, the product $I_L*(1-D)$ does not necessarily increase, but could decrease. For example, as both the duty cycle and the current increase, at first the increase in the current $I_L$ can be larger than the decrease in the quantity (1-D), so the product can still increase, indicating an increase in output power. However, at and above a certain threshold value of $D_T$, the quantity (1-D) will decrease to the point that the product $I_L*(1-D)$ will no longer increase, but will decrease. As a result, the VVC output voltage will drop. Having a decreased VVC output voltage with an increased D contradicts basic VVC control principles, confusing the VVC controller, disrupting VVC stability and generating VVC oscillations.

Unfortunately, it is very difficult to resolve the intrinsic VVC oscillation issue without compromising the VVC or vehicle performance, or unrealistically increasing the VVC output capacitor capacitance. As mentioned previously, some proposed solutions use software methods to customize VVC circuits to avoid the oscillation problems, however such solutions are time-consuming as the software controllers must reflect hardware circuit designs, difficult to transport from one VVC to another, and often compromise vehicle performance.

As a further example in which VVC control can be lost, consider active motor damping (AMD) operations in an HEV. As discussed above, HEVs often perform regenerative braking operations in which kinetic energy is transferred to electrical energy to slow the vehicle and recharge the battery of a PEC system. AMD can be employed on an HEV during braking operations, and is described more fully in U.S. Pat. No. 7,024,290, issued to Zhao et al. on Apr. 4, 2006, which is incorporated in its entirety herein by reference. AMD operations on an HEV are similar to ABS operations on a conventional vehicle in which a braking force is alternately applied and released to slow and stop the vehicle. For example, during an emergency braking event an HEV operator can quickly and forcefully depress a brake pedal, causing a rapid transfer of energy away from a motor to slow the vehicle. After a period of time, energy is again transferred from the battery side to the inverter side of the VVC. Such rapid oscillation of energy transfer, can cause VVC instability, particularly when large amounts of energy are exchanged. The present invention provides a system and apparatus with output minimal voltage direct clamping in which a VVC is stabilized so that the output voltage on its inverter side does not fall below the high voltage battery input voltage on its battery side during boost or transient operations. The invention provides a system in which the VVC output voltage is clamped to a minimum voltage any time a sudden power demand from a motor/generator means causes the output voltage to drop, significantly improving VVC stability and performance during electric drive and AMD operations. In addition to providing VVC voltage stability, a stabilizing means of the invention can improve the transient power response of an ISC while reducing operating costs and simplifying circuit design.

FIG. 1 illustrates a schematic of an example vehicle 100. The vehicle 100 may be of any suitable type, such as a hybrid electric (HEV) or plug-in hybrid electric vehicle. In at least one embodiment, the vehicle 100 may include a first wheel set 112, a second wheel set 114, an engine 116, an HEV transaxle 118 and an electric drive system 120. The electric drive system 120 may be configured to provide torque to the first and/or second wheel sets 112, 114. The electric drive system 120 may have any suitable configuration. Moreover, in a hybrid electric vehicle the electric drive system 120 may be a parallel drive, series drive, or split hybrid drive as is known by those skilled in the art. For example, the electric drive system 120 may include a power electronics converter (PEC) 122 coupled to a Permanent Magnet Synchronous Machine (PMSM) 134. It is contemplated that the PMSM 134 can function as a motor, converting electrical energy to kinetic energy, or as a generator, converting kinetic energy to electrical energy. In an example embodiment, the PEC 122 can be connected to a first PMSM functioning as a motor, and a second PMSM functioning as a generator. The PMSM 134 can be powered by one or more power sources to drive the vehicle traction wheels. The PMSM 134 may be of any suitable type, such as a motor, motor-generator, or starter-alternator. In addition, the PMSM 134 may be associated with a regenerative braking system for recovering energy.

The EDS 120 can be coupled to a power transfer unit 140, which in turn can be coupled to a differential 145 to control the wheel set 114. The power transfer unit 140 may be selectively coupled to at least one PMSM 134. The power transfer unit 140 may be of any suitable type, such as a multi-gear "step ratio" transmission, continuously variable transmission, or an electronic converterless transmission as is known by those skilled in the art. The power transfer unit 140 may be adapted to drive one or more vehicle wheels. In the embodiment shown in FIG. 1, the power transfer unit 140 is connected to a differential 145 in any suitable manner, such as with a driveshaft or other mechanical device. The differential 145 may be connected to each wheel of the second wheel set 14 by a shaft 147, such as an axle or halfshaft.

The vehicle 100 may also include a vehicle control system (VCS) 150 for monitoring and/or controlling various aspects of the vehicle 100. The VCS 150 may communicate with the electric drive system 120, and the power transfer unit 140 and their various components to monitor and control operation and performance. The VCS 150 may have any suitable configuration and may include one or more controllers or control modules.

In the example embodiment of FIG. 1, the PEC 122 includes a power source, embodied as power supply 123, and an inverter system control (ISC) 124, having a stabilized VVC. As an example, power supply 123 can be in the form of a high voltage battery. The ISC 124 can include hardware circuitry configured to provide power to the PMSM 134 from the power supply 123. The ISC 124 can be coupled to an ISC controller (not shown), which can be in the form of a microprocessor-based device configured to control operation of the ISC 124, and comprise hardware, software, firmware or some combination thereof. An ISC controller can be electrically coupled to the VCS 150 from which it can receive signals from other control units regarding vehicle system operation and control.

Figure 2:
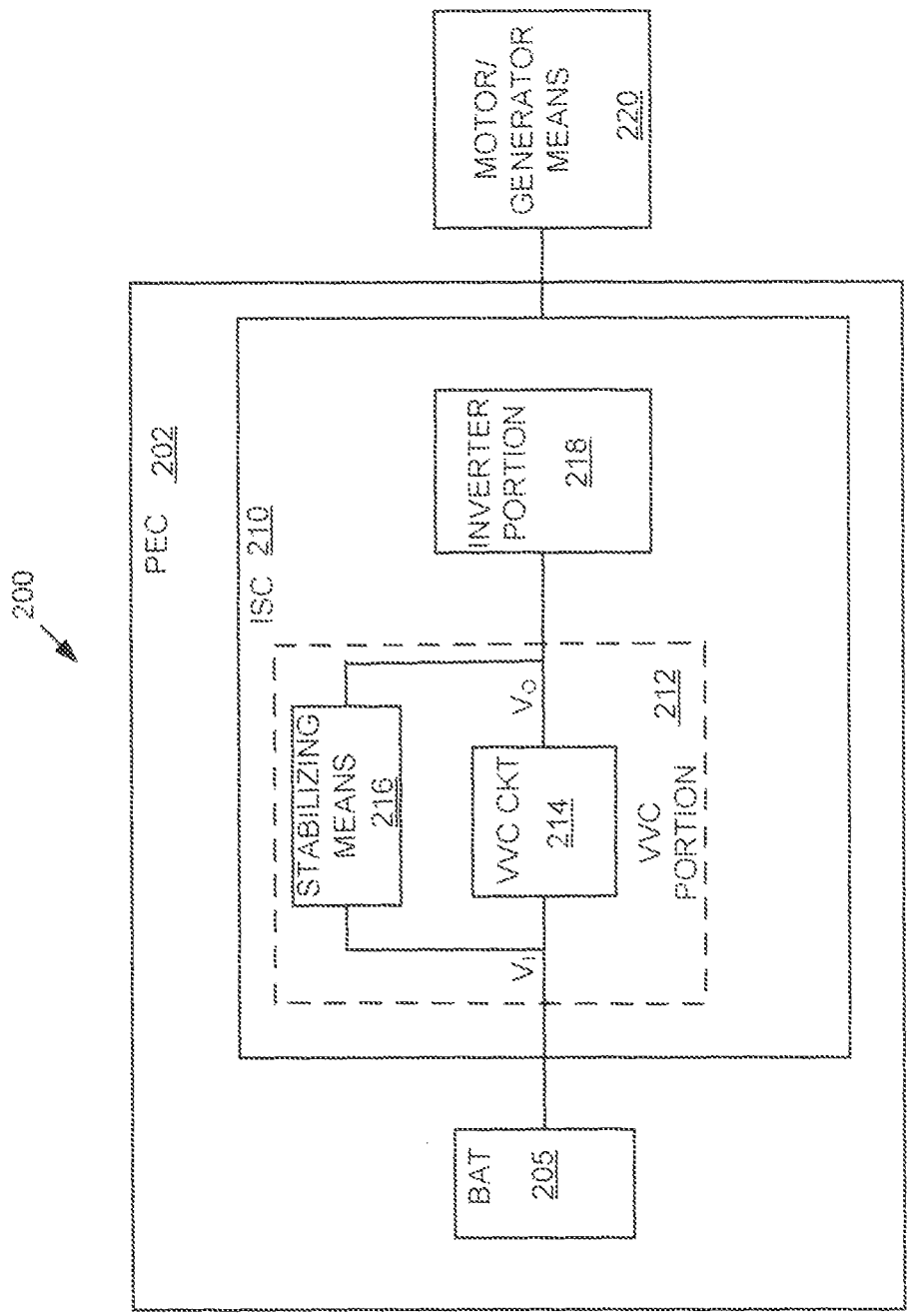
FIG. 2 shows an example electric drive system having a VVC stabilizer.

FIG. 2 depicts an example system 200. As an example, the system 200 can be employed as an EDS for a vehicle. It is understood that a vehicle EDS may also include additional components, such as an ISC controller, additional control units, and other elements and interfaces as necessary for the use for which it is intended. However, these additional elements are not depicted in FIG. 2 in order to better emphasize the novel features of the present invention. The system 200 can include a PEC 202 comprising a power supply, embodied in this example as a high voltage battery 205, and an ISC 210, and, coupled to the PEC 202, a motor/generator means 220. The ISC 210 includes a variable voltage converter (VVC) portion 212, and an inverter portion 218. The VVC portion 212 is configured to provide power from the battery 205 to the inverter portion 218, which is in turn configured to provide power to the motor/generator means 220. The motor/generator means 220 can be embodied as at least one PMSM that can operate as a motor to drive the wheels of an HEV. Accordingly, the VVC portion 212 is configured to boost the voltage $V_{IN}$ to a higher voltage $V_O$ as required to drive the motor/generator means 220 embodied as a motor. The motor/generator means 220 can comprise one or more PMSMs that can be configured to operate as a motor or as a generator.

As shown in FIG. 2, the VVC portion 212 includes a VVC circuit 214 and a stabilizing means 216 configured to stabilize the output voltage Vo. In an exemplary embodiment, the stabilizing means 216 prevents the output voltage Vo from falling below the input voltage Vi during transient operations or during times of high power demand by the motor/generator means 220. The stabilization of the output voltage Vo is a significant advantage of the present invention. A further advantage offered by the present invention is improved system efficiency. For a typical HEV, a VVC operates in a boost mode for a relatively small percentage of the time, for example around 5% of the time the HEV is operated. For the remaining larger share of the time, transient power is simply passed through a VVC to an inverter, without voltage boost. In an exemplary embodiment, the stabilizing means 216 provides a means by which energy can be transferred to the inverter 218 without having to go through the VVC circuit 214, effectively enabling a VVC bypass mode for the ISC 210, which conserves power, and improves power response, as will be discussed in more detail below.

Figure 3:
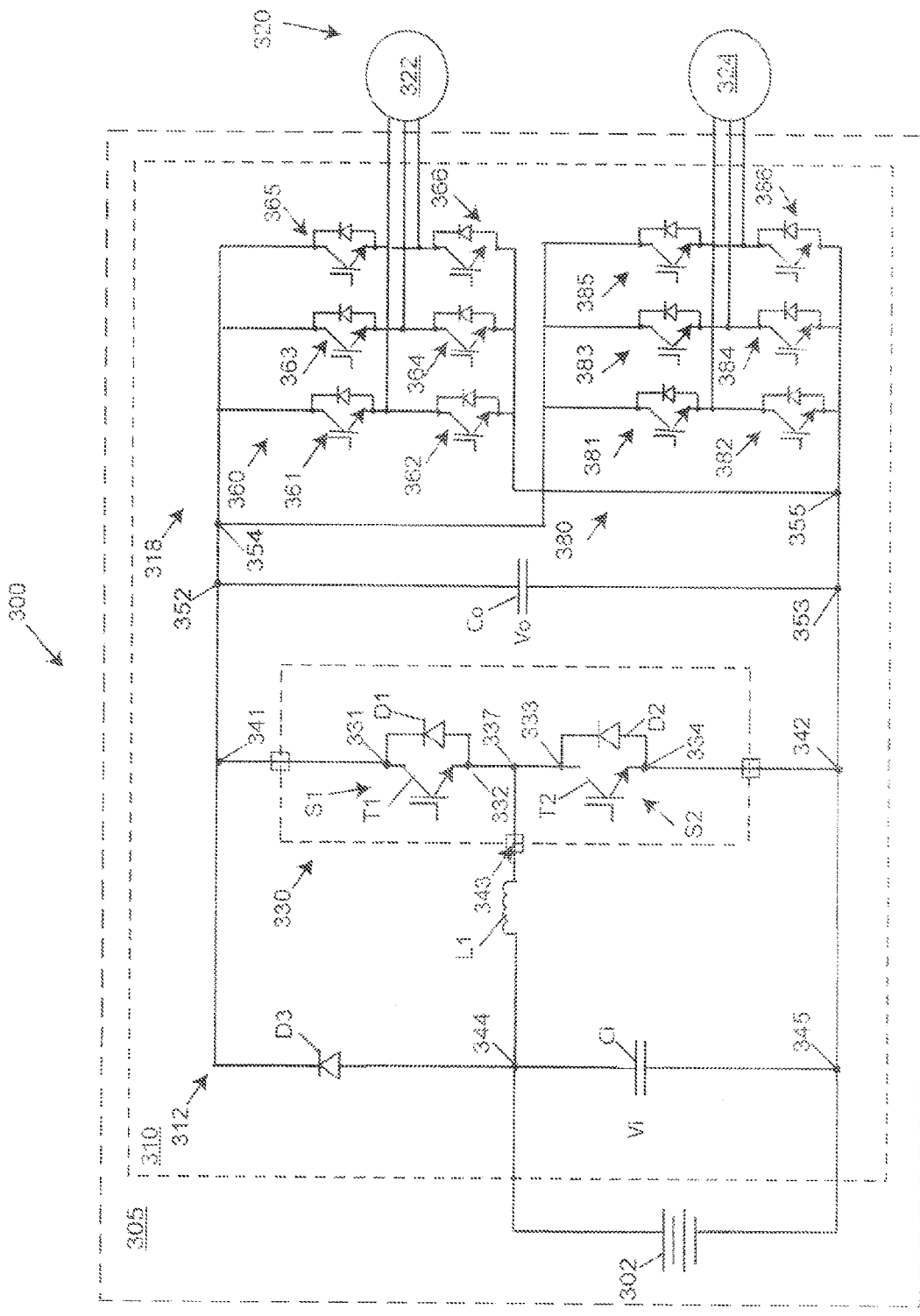
FIG. 3 shows an example electric drive system having a VVC stabilizer.

FIG. 3 shows an example embodiment 300 having a stabilized VVC. The system 300 includes a PEC 305 and a motor/generator portion 320. The PEC 305 includes a power source that is embodied as a high voltage (HV) battery 302, as well as an ISC 310. The example motor/generator portion 320 includes a first PMSM operated as a motor 322, and a second PMSM operated as a generator 324.

The ISC 310 includes a VVC portion 312 coupled to an inverter portion 318. The VVC portion 312 includes an input capacitor Ci, an input inductor L1, a VVC circuit branch 330, an output capacitor Co, and a stabilizing means, embodied as diode D3. The input capacitor Ci is connected across the HV battery 302 at nodes 344, 345. The input voltage Vi is defined as the voltage across the input capacitor Ci, typically reflecting the voltage of the HV battery 302.

The inductor L1 provides a means for storing energy at the ISC 310 so that variable voltages and currents can be provided as WC portion 312 output, In general, a WC is configured to boost a lower voltage on the input side to a higher voltage on the output side in response to a demand from a load. A first terminal of the inductor L1 is electrically connected to the node 344, and a second terminal of the inductor L1 is connected at node 343. In an exemplary embodiment, the WC circuit branch 330 comprises a first switch S1 and a second switch S2 coupled at a node 337. The first switch S1 comprises a first transistor T1 and a first diode D1, coupled together at nodes 331 and 332. The second switch S2 comprises a second transistor T2 and a second diode D2 coupled together at nodes 333 and 334.

On the output side is a parallel circuit branch containing the output capacitor Co. The output capacitor Co functions as an energy storing device for the VVC portion 312, controllably transferring energy to the inverter portion 318. The VVC output voltage Vo, is the voltage across the output capacitor Co. During boost operation, current flows through the inductor L1 to the VVC circuit branch 330, where both switches S1 and S2 are alternatively switched on or off. The input voltage Vi is boosted to a higher output voltage Vo.

As discussed in preceding paragraphs, there are occasions during boost operations that a sudden power demand from a load, such as a motor, can prompt a drop in an output voltage of a VVC, and may render the VVC unstable. The present invention addresses this problem by providing a stabilizing means to prevent a VVC output voltage from falling below its input voltage, so that a minimum voltage output is provided. In the example system 300, a stabilizing means, embodied as the diode D3, is provided. A first terminal of the diode D3 can be electrically connected to the input capacitor and HV battery at the node 344. A second terminal of the diode D3 can be connected at node 341. As shown in FIG. 3, the diode D3 can clamp the VVC portion 312 output voltage on the inverter side, Vo, to the input voltage on the battery side Vi any time a sudden power demand from the motor/generator means 320 causes drop in the VVC 312 output. By clamping the output voltage Vo to the input voltage Vi, the diode D3 can prevent the voltage Vo from dropping below the voltage Vi, stabilizing the VVC portion 312, thereby avoiding the instability and loss of VVC control that can occur in the absence of a stabilizing means.

Apart from the instrinsic instability discussed above, a further disadvantage of a prior art VVC and ISC is that current flowed through an inductor and the switches of a VVC during boost, buck and pass-through operations. Inductor characteristics limit the power response of the VVC, thereby limiting the performance of the ISC and PEC. The voltage across an inductor is a function of inductance and the rate at which current is changing. Accordingly the rate at which power can be transferred by a PEC is dependent on the characteristics of the inductor, which intrinsically opposes changes in current. In addition, because current flow through an inductor generates heat, the thermal characteristics of the inductor and the maximum current flow through the inductor must be considered when determining the requirement for and specifications of an appropriate cooling means for a VVC circuit. Accordingly, it follows that PEC or ISC circuits having all current flow through an inductor can be expensive as well as inefficient since an inductor can limit power flow and induce power losses in the system.

The present invention exploits the fact that a VVC in a PEC of an HEV predominantly operates in a pass-through or transient mode in which there is no voltage boost or buck. In an exemplary embodiment, a stabilizing means enables a bypass mode in which transient current and voltage can be provided to an inverter without requiring current flow through a VVC input inductor and switches. When no voltage boost is required, current can flow through D3, shunting L1 and the VVC circuit branch 330. Thus the present invention enables a bypass mode in which transient power is provided from the battery 302 side to the inverter portion 318 through the diode D3, with switches S1 and S2 open or turned OFF.

Bypass of the inductor L1 and the WC circuit branch 330 provides a quicker power response, reduces power loss through a PEC, and eases the required specifications for an inductor coupled at the input of a VVC. For example, the rate at which power can be transferred is faster when current flows through D3 rather than through L1 and the VVC circuit branch 330, primarily because the diode D3 can have a quicker response and does not store energy in a magnetic field like the inductor L1 does. Since current will flow through D3 for roughly 95% of the time, the power response of the PEC 305 will be improved. In addition, when conducting current, the diode D3 has less forward voltage drop and generates less heat than the inductor L1, reducing the heat generated by the PEC 305. Compared to prior art circuits in which current flowed through a WC inductor and switches under all conditions, the inductor L1 will conduct for only about 5% of the time that an HEV is operated. Accordingly, the thermal requirements for the inductor L1 can be less demanding than prior art VVC inductors, and the need for a dedicated cooling path to the inductor can be obviated. Furthermore, the inductor L1 can be designed with a smaller wire size than that used for an inductor employed in a prior art VVC in which current flow was directed through an inductor under all operating conditions.

In an exemplary embodiment, the diode D3 is in the form of a general purpose diode. As a general purpose diode, D3 need not have the fast-switching capability desired in the switching diodes D1 and D2. The diode D3 can be a relatively cheap, low forward voltage drop diode, providing the PEC 305, and more particularly the VVC portion 312 with a quicker power response than that of conventional power conversion circuits, so that power can be drawn by the motor 322 more rapidly. In addition, due to its increased current capacity and its reduced power losses (less heat generated) compared to an inductor, the diode D3 increases the maximum amount of power that can be provided to the inverter portion 318 during a transient operational mode. Owing to the advantageous characteristics of the diode D3 and the condition that power is transferred to the inverter by the diode D3 for roughly 95% of the time that an HEV is operated, the diode D3 can substantially reduce power losses for the ISC 310 over its prior art counterparts. For example, assuming a VVC current of 100 A, with a D3 typical forward voltage drop of around 0.75V, the transient power loss of the present invention is around 75 W. In prior art systems having all current flow through an inductor and VVC, the inductor resistance is typically around 20 m ohms and the voltage drop across a diode of an upper switch is around 1.2V, yielding a power loss of around 320 W, roughly four times as high as the present invention. Considering the fact that a transient mode is in effect for approximately 95% of the time that a VVC is operational, the significance of the improved efficiency achieved by the invention can be appreciated.

In addition to the stability and efficiency offered by the invention, a further advantage is that it provides a simple, low-cost solution to the aforementioned problems. The implementation cost is the additional cost of the diode D3, which can be a generic diode. The cost of the additional diode is more than offset by the reduced requirements for the VVC input inductor.

The inverter portion 318 can provide a three-phase current to the motor/generator means 320 and include the motor inverter portion 360 and the generator portion 380 coupled to the VVC portion 312 at nodes 354, 355. In an example embodiment, the motor inverter portion 360 comprises six switches 361-366, each comprising a transistor/diode pair in a parallel arrangement. In an exemplary embodiment the transistors of the switches 361-366 can comprise any type of controllable switches, e.g. insulated gate bipolar transistor (IGBT), metal-oxide-semiconductor field-effect transistor (MOSFET), etc. The diodes of the switches 361-366 can comprise any type of diode, but are preferably fast-switching diodes.

Similarly, the generator inverter portion 380 can include six switches 381-386, each comprising a transistor/diode pair in a parallel arrangement. In an exemplary embodiment the transistors of the switches 381-386 can comprise any type of controllable switches, e.g. insulated gate bipolar transistor (IGBT), metal-oxide-semiconductor field-effect transistor (MOSFET), etc. The diodes of the switches 381-386 can comprise any type of diode, but are preferably fast-switching diodes. As discussed earlier, the motor 322 can be a PMSM configured to operate as a motor, and the generator 324 can be a PMSM configured to operate as a generator.

Example embodiments of a variable voltage converter with stabilizing means and a system in which it can be incorporated, are presented herein. In an exemplary embodiment, a stabilizing means can prevent an output voltage of a VVC from falling below an input voltage of a VVC. For example, when employed in an electric drive system of a hybrid electric vehicle, a stabilizing means can prevent a VVC output voltage from falling below the high voltage battery voltage during a sudden power demand from a motor/generator means during an electric drive operation or during AMD operations. In addition, a stabilizing means can provide transient power flow from a power source to an inverter in a manner that circumvents an inductor or VVC. In a preferred embodiment, a stabilizing means is in the form of a relatively inexpensive general purpose diode that provides an easily implemented, low cost solution to the oscillation problems experienced by prior art PEC circuits. Furthermore, the stabilizing diode can provide quicker transient power response at a reduced cost compared to prior art ISC circuits in which current flows through a VVC inductor and switches during transient operation.

Additional embodiments will occur to those skilled in the art. Although the invention has been discussed with respect to specific embodiment thereof, the embodiments are merely illustrative, not restrictive of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like. In other instances, well-known structures or operations are not specifically shown or described in detail to avoid obscuring aspects of embodiments of the present invention. Reference throughout this specification to "one embodiment", "an embodiment", "example embodiment", or "specific embodiment" does not necessarily reference the same embodiment, and furthermore means that a particular feature, structure or characteristic described in connection with the embodiment is included in at least one embodiment of the present invention but not necessarily in all embodiments.

It will also be appreciated that one or more of the elements depicted in the drawings can also be implemented in a more separated or integrated manner, or even removed, as is useful in accordance with a particular application. As used in the description herein and throughout the claims that follow, "a", "an" and "the" include plural references unless the context dictates otherwise.

Thus, while the present invention has been described herein with reference to particular embodiments thereof, latitude of modifications, various changes and substitutions is intended in the foregoing descriptions. It is understood that the invention is not to be limited to the particular terms used in the following claims, but that the invention will include any and all embodiments and equivalents falling within the scope of the appended claims.

I claim:

1. A system comprising:
    a power source;
    a variable voltage converter (VVC) configured to boost an input voltage to provide a VVC output across an output capacitor, said VVC comprising an input capacitor coupled to said power source and to an input inductor at a first node, said input inductor coupled, at a second node, to a circuit branch comprising upper and lower switching units; and
    a stabilizing means configured to prevent loss of stability of said VVC during said VVC conversion and transfer of energy between said power source and said output capacitor, said stabilizing means comprising a stand-alone diode directly coupled to said first node and connected to said output capacitor at a third node.

2. The system of claim 1, wherein said stabilizing means is configured to clamp said VVC output to an input voltage at said VVC to prevent oscillation at said VVC in response to a rapid fluctuation in said energy transfer.

3. The system of claim 1, wherein said stabilizing means is configured to prevent a voltage at said output capacitor from falling below an input voltage at said VVC input capacitor when said output produced by boost operation of said VVC falls below said input voltage.

4. The system of claim 1, wherein said circuit branch comprises
    an upper switching unit and a lower switching unit, said switching units configured to operate under controlled first ($D_1$) and second ($D_2$) duty cycles respectively to provide said VVC output, said upper and lower switching units connected in series to one another at said second node.

5. The system of claim 4, wherein said stabilizing means prevents a voltage provided to a load coupled to said output capacitor from falling below said VVC input voltage when said VVC output produced by boost operation of said inductor and upper and lower switches falls below said VVC input.

6. The system of claim 5, wherein said stabilizing means is configured to prevent said voltage at said output capacitor from falling below said VVC input voltage when an increase in said duty cycle $D_2$ for said lower switching unit is associated with a decrease in VVC output produced by said inductor and upper and lower switches.

7. The system of claim 4, wherein said stabilizing means is configured to transfer transient energy from said input capacitor to said output capacitor by shunting said input inductor.

8. An electrical circuit, comprising:
    an energy storage device (ESD);
    a variable voltage converter (VVC) configured to boost an input voltage, said VVC comprising:
    an input capacitor coupled to said ESD,
    an input inductor coupled to said input capacitor at a first node,
    a circuit branch comprising a first switching unit coupled in series to a second switching unit, said circuit branch coupled to said input inductor at a second node, and
    an output capacitor; and
    a bypass means configured to transfer transient energy from said input capacitor to said output capacitor by shunting said input inductor, wherein said bypass means comprises a stand-alone diode.

9. The circuit of claim 8, wherein said bypass means is arranged in series with said input capacitor.

10. The circuit of claim 8, wherein said diode is electrically connected to said input capacitor at said first node, and is electrically connected to said output capacitor at a third node.

11. The circuit of claim 8, wherein said ESD comprises a high voltage battery configured to provide energy for an electric drive system of an electrified vehicle.

12. The circuit of claim 8, wherein said first and second switching units are configured to be open during said transient energy exchange.

13. The circuit of claim 8, wherein said bypass means prevents said output capacitor voltage from falling below said input capacitor voltage when boost operation of said VVC provides output that falls below said VVC input.

14. The circuit of claim 8, wherein said bypass means is directly connected to said first node, and is connected to said output capacitor at a third node.

* * * * *